United States Patent
Nientiedt

(10) Patent No.: US 7,953,403 B2
(45) Date of Patent: May 31, 2011

(54) METHOD AND ARRANGEMENT FOR DETECTING A RADIO COVERAGE

(75) Inventor: Robert Nientiedt, Delbrück (DE)

(73) Assignee: Siemens Enterprise Communications GmbH & Co. KG, Munich (DE)

( * ) Notice: Subject to any disclaimer, the term of this patent is extended or adjusted under 35 U.S.C. 154(b) by 464 days.

(21) Appl. No.: 10/591,557

(22) PCT Filed: Jan. 14, 2005

(86) PCT No.: PCT/EP2005/050142
§ 371 (c)(1),
(2), (4) Date: Aug. 31, 2006

(87) PCT Pub. No.: WO2005/086515
PCT Pub. Date: Sep. 15, 2005

(65) Prior Publication Data
US 2007/0197243 A1    Aug. 23, 2007

(30) Foreign Application Priority Data
Mar. 2, 2004   (DE) .......................... 10 2004 010 182

(51) Int. Cl.
*H04W 24/00* (2009.01)
(52) U.S. Cl. ........ 455/423; 455/424; 455/449; 455/502; 455/464; 370/331; 370/332; 370/350
(58) Field of Classification Search .................. 455/446, 455/502, 423–424, 448–450, 524–525, 435.2, 455/464, 436; 370/350, 503, 437, 331–335
See application file for complete search history.

(56) References Cited

U.S. PATENT DOCUMENTS

| | | | | |
|---|---|---|---|---|
| 5,854,981 A | * | 12/1998 | Wallstedt et al. | 455/439 |
| 5,924,029 A | * | 7/1999 | Sohngen et al. | 455/423 |
| 6,006,092 A | * | 12/1999 | Ward | 455/438 |
| 6,122,505 A | * | 9/2000 | Genell et al. | 455/423 |
| 6,600,758 B1 | * | 7/2003 | Mazur et al. | 370/508 |
| 6,862,447 B1 | * | 3/2005 | Solondz | 455/423 |
| 6,985,735 B2 | * | 1/2006 | Gustafsson | 455/446 |
| 7,002,948 B2 | * | 2/2006 | Kato | 370/350 |
| 2003/0156575 A1 | * | 8/2003 | Kassinen et al. | 370/350 |
| 2004/0018843 A1 | * | 1/2004 | Cerwall et al. | 455/450 |
| 2005/0197124 A1 | * | 9/2005 | Kang et al. | 455/439 |
| 2007/0225028 A1 | * | 9/2007 | Nelson et al. | 455/524 |

FOREIGN PATENT DOCUMENTS

| | | | |
|---|---|---|---|
| EP | 1 304 896 A2 | | 4/2003 |
| EP | 1304896 A2 | * | 4/2003 |
| GB | 2 347 826 A | | 9/2000 |
| WO | WO 96/38990 A2 | | 12/1996 |
| WO | WO 99/33297 A1 | | 7/1999 |
| WO | WO 02/28136 A1 | | 4/2002 |

* cited by examiner

*Primary Examiner* — Nick Corsaro
*Assistant Examiner* — Sarwat Chughtai

(57) ABSTRACT

A method and arrangement for detecting a radio coverage in a synchronous multicellular mobile radio system having a multitude of synchronous base stations that are connected to an evaluating unit are provided. All base stations are operated in succession in a measuring operating mod. A respective field intensity of base stations that are locally adjacent and in a normal operating mode is measured, and the respectively measured field intensity data are evaluated by the evaluating unit. This enables a sufficient radio coverage to be determined in a highly cost-effective manner and, optionally, to be corrected.

10 Claims, 3 Drawing Sheets

FIG 3A
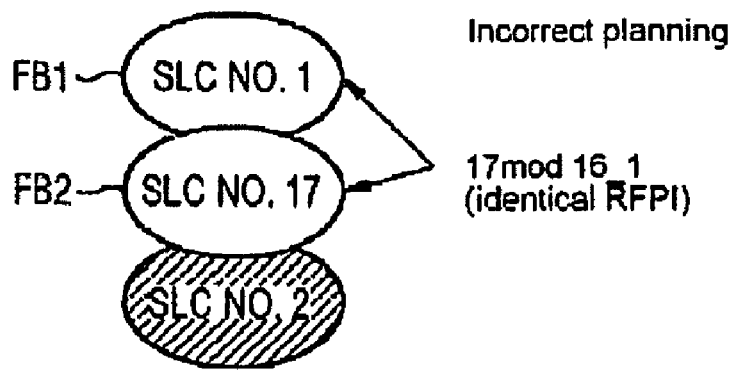
Incorrect planning
17mod 16_1 (identical RFPI)
FIG 3B
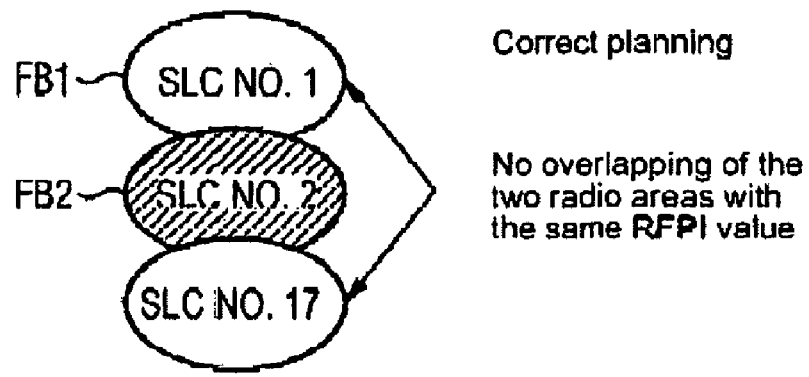
Correct planning
No overlapping of the two radio areas with the same RFPI value
FIG 3C
| Radio area | DECT syst. ID | SLC no. (binary) | Base station no. |
|---|---|---|---|
| 1 SLC NO. 1 | X | 0001 | X |
| 2 SLC NO. 17 | X | 0001 | X |
| 3 SLC NO. 2 | X | 0010 | X |

METHOD AND ARRANGEMENT FOR DETECTING A RADIO COVERAGE

CROSS REFERENCE TO RELATED APPLICATIONS

This application is the US National Stage of International Application No. PCT/EP2005/050142, filed Jan. 14, 2005 and claims the benefit thereof. The International Application claims the benefits of German application No. 102004010182.5 DE filed Mar. 2, 2004, both of the applications are incorporated by reference herein in their entirety.

FIELD OF INVENTION

The present invention relates to a method and an arrangement for detecting a radio coverage, and especially to a method and a arrangement for detecting a radio coverage in a synchronous multicellular mobile radio system in accordance with the DECT standard.

BACKGROUND OF INVENTION

Multicellular mobile radio systems are usually arranged in hierarchical structures. A telecommunications terminal such as a subscriber's mobile unit for example communicates in such systems with a base station, which takes over the radio coverage of a geographical area, a so-called radio cell. The base stations in their turn can be connected to switching centers, for example a communication system, which allows interworking with other communication networks. In the ideal case a radio cell with a hexagonal structure is covered by a base station, with the base station usually being positioned in the center of the cell. In reality however the embodiment of the network structure is influenced by the geographical topology, since height, landscape and architecture profile influence the wave propagation of a base station and thereby distort a regular structure.

Especially in buildings, such as production shops for example, where the architecture profiles heavily influence the wave propagation, radio coverage or suitable radio field illumination must be detected at regular intervals for the design and the checking of the mobile radio network, in order for example to prevent a fault or an interruption in a telecommunication connection, especially during what is known as a handover between two radio cells within a radio area or what is known as roaming between two areas consisting of a plurality of radio cells.

Usually this check on a suitable radio field illumination or radio coverage is performed manually in a multicellular mobile radio system with a metering unit developed specifically for the purpose. To put it more precisely, measuring crews use a mobile measuring device to at least make spot checks on the area to be covered by the multicellular mobile radio system, and if radio coverage is absent or is insufficient a correction of the mobile radio system is undertaken. Such a check must be repeated especially after changes to building or expansion of the multicellular mobile radio system in order to guarantee a sufficient radio field illumination, but this generates extraordinarily high costs.

A method is known from EP 1 398 910 A2 for automatic detection of a radio coverage in a multicellular mobile radio system. In this method a plurality of base stations are connected to a control unit, in which case all base stations are switched into a receive operating mode and a relevant field strength of locally adjacent base stations is measured. The measured field strength data is subsequently evaluated in an evaluation unit.

SUMMARY OF INVENTION

An underlying object of the invention is thus to create a method and an arrangement for detecting a radio coverage which is especially cost effective.

In accordance with the invention this object is achieved with regard to the method and with regard to the arrangement in the claims.

Especially by using a multicellular mobile radio system with a plurality of base stations, which are connected to an evaluation unit, whereby all base stations are switched consecutively into a measuring operating mode, a relevant field strength of locally adjacent base stations operating in a normal mode of operation is measured, and the measured field strength data is subsequently evaluated by the evaluation unit, can a real radio field illumination or radio coverage be detected with sufficient accuracy and minimum costs, especially without deployment of personnel.

Preferably base stations operated in the relevant measuring operating mode are in synchronicity with the base stations which are in normal operating mode, which, as well as a field strength, also allows a quality of the synchronicity to be included for detecting a radio coverage. The detection of the radio coverage is further improved by this method and thereby allows further evaluation alternatives.

Preferably the detection of the radio coverage is performed at predetermined intervals and especially in cycles, with a comparison of a current evaluation result with one or more previous evaluation results being undertaken. In this way constructional changes within a building in particular which lead to changes in radio coverage can be detected at predetermined intervals and corrected where necessary.

The evaluation unit in this case preferably controls the base stations automatically, with an evaluation of the measured data preferably also being undertaken automatically.

Furthermore the measured field strength data, in addition to an actual field strength and an associated synchronicity quality, can also have a base station identifier, which, especially in DECT systems enables possible misplanning through arrangement of base stations with the same RFPI (Radio Fixed Part Identification) value to be reliably prevented.

In addition the evaluation unit can also create a geographical field strength map based on the measured field strength data, which can furthermore be included for precisely determining the position of mobile units within the multicellular mobile radio system.

Further advantageous embodiments of the invention are identified in the dependent claims.

BRIEF DESCRIPTION OF THE DRAWINGS

The invention will be explained below in greater detail on the basis of an exemplary embodiment which refers to the drawing.

The figures show:

FIG. 3A an exemplary simplified diagram for incorrect planning of overlapping radio areas in a DECT mobile radio system;

FIG. 3B an exemplary simplified diagram for correct planning of overlapping radio areas in a DECT mobile radio system; and FIG. 3C an exemplary table for planning of overlapping radio areas in a DECT mobile radio system.

DETAILED DESCRIPTION OF INVENTION

The invention will be described below with reference to a multicellular mobile radio system which is designed in accordance with the DECT (Digital Enhanced Cordless Telecommunications) standard.

Figure 1:
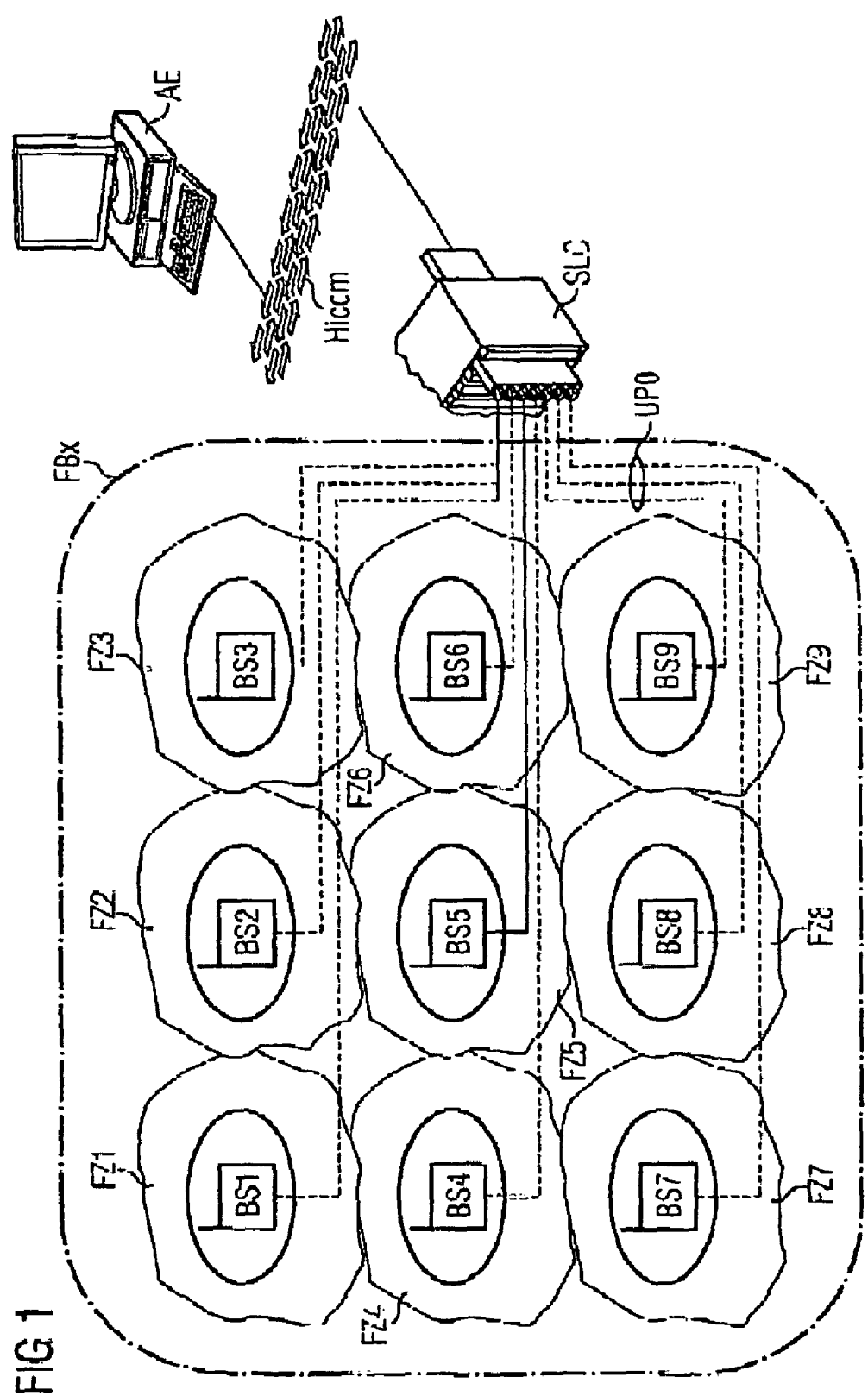
FIG. 1 a simplified diagram of a multicellular mobile radio system with one radio cell.

FIG. 1 shows a simplified diagram of this type of DECT multicellular mobile radio system, with for example nine base stations BS to BS9 connected via a first communication interface UP0 to a Subscriber Line Card (SLC). The subscriber line card SLC can in its turn be connected via a second communication interface HICOM to an evaluation unit AE.

Each base station BS1 to BS9 is used for radio service provision to a predetermined geographical area, which is represented by a radio cell FZ1 to FZ9 in each case. The totality of the radio cells FZ1 to FZ9 represents a radio area FBx to which a subscriber line card SLC is assigned in each case. Within a subscriber line card SLC a maximum of 16 base stations can be connected for implementing a shared radio area. Furthermore there is the peculiarity that only a four-digit binary code is available as an SLC identifier for the subscriber line card SLC, so that a maximum of 16 subscriber line cards SLC can be provided with a unique identifier, which means that a seventeenth subscriber line card features the same SLC identifier as a first subscriber line card for example.

The first communication interface UPO is for example a ping pong or burst interface, but is also possible to use alternate interfaces. The second communication interface HICOM is implemented for example by a private communication network or by alternate interfaces. The evaluation unit AE is represented for example by a PC connected to the second communication interface or by an external server connected via a second communication interface or further network and can however also be located within the subscriber line card SLC itself.

For the multicellular mobile radio system in accordance with the DECT standard shown in FIG. 1 to function smoothly, the high-quality illumination of the radio cells and/or radio areas to be covered is very important. With bad radio field illumination or bad radio field coverage, interrupted calls, noise problems and/or unavailability of a subscriber terminal not shown in the diagram are inevitable.

The number of base stations in such a multicellular mobile radio system is usually dimensioned in accordance with traffic values and especially with a radio coverage or radio illumination of the building/area. The topology of these stations is entered into an installation plan and is thus known. With this information a theoretical radio distribution or radio coverage of the base stations can initially be calculated, which however differs sharply from a real radio field distribution.

To detect this type of real radio field distribution or radio coverage, all base stations of the synchronous multicellular mobile radio system are now switched consecutively in accordance with the invention into a measuring operating mode, in which a relevant field strength of locally adjacent base stations which are in normal operating mode is measured. The measured field strength data is subsequently forwarded to the evaluation unit AE and a real radio field distribution or radio coverage is approximated there using the additional radio field strength values.

Figure 2:
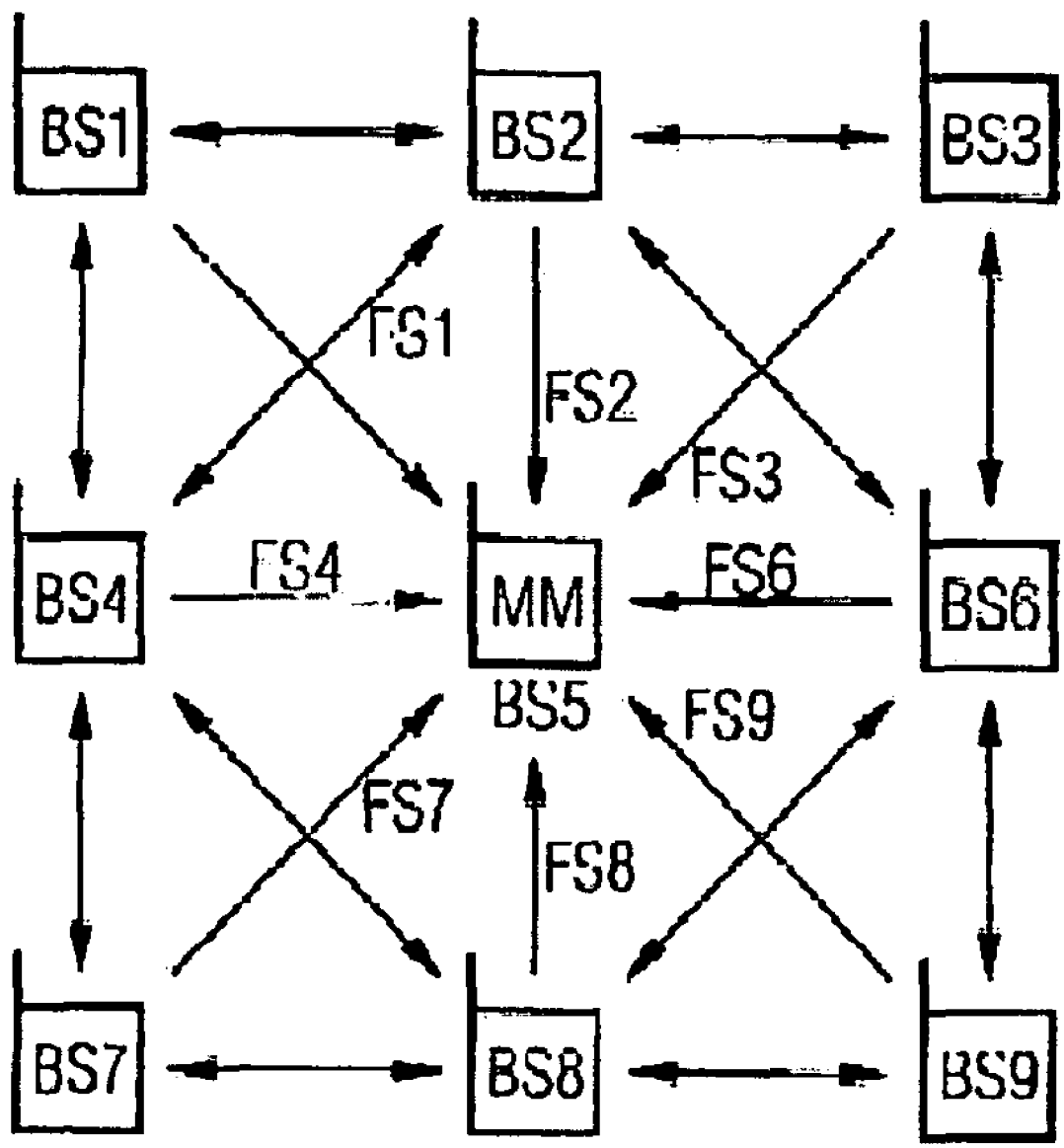
FIG. 2 a simplified diagram of a measuring mode of operation in the mobile radio system depicted in FIG. 1.

FIG. 2 shows a simplified diagram to illustrate such a measuring operating mode in a DECT mobile radio system as depicted in FIG. 1, with the same reference symbols indicating the same or corresponding elements and a repeated description of such elements being dispensed with.

In accordance with FIG. 2 for example a base station 5 is switched temporarily or for a short period into a measuring operating mode, whereas the other base stations of the mobile radio system and especially the locally adjacent base stations BS1 to BS4 and BS6 to BS9 of the base station BS5 which is in a measuring operating mode are operated in normal mode. Normal mode in this case is taken to mean an operating mode in which the base station is connected in the usual manner via the available communication channels with the other base stations or the mobile units not shown in the diagram and is thus in a transmit/receive mode of operation. In measuring operating mode on the other hand no data is received by base stations or mobile units not shown in the diagram or transmitted to them, but only a measurement of signals received from the adjacent base stations. In particular in this case a relevant field strength of the base stations located in the receive area is detected or measured.

To put it more precisely the base station BS5 measures the field strength FS1 of base station 1 available at its location. In the same way it also measures the field strengths FS2 to FS4 and FS6 to FS9 available at its location of the other base stations BS2 to BS4 and BS6 to BS9 lying within its receive area, which are for example grouped around the base station BS5 and are operated in normal operating mode. This field strength data additionally measured and assigned to the relevant base stations will subsequently for example be sent via the subscriber line card SLC to the evaluation unit AE.

Subsequently the base station BS5 is switched back into its normal operating state or into its normal operating mode and a further base station of the multicellular mobile radio system is put into the measuring operating mode, with an additional set of field strength data again being measured and transmitted to the evaluation unit AE. After all base stations of the mobile radio system or of the partial area to be observed have been switched into such a measuring operating mode and all associated field strength data has been transferred to the evaluation unit AE, this additional field strength data is now evaluated in the evaluation unit AE.

To put it more precisely, using the additional field strength data for each measuring point or each base station put into measuring operating mode, a real radio field distribution or radio coverage of the multicellular mobile radio system is now calculated, with deficiencies or insufficient radio illumination within the mobile radio system being able to be compensated for. Since in accordance with the invention no mobile measurement crews are needed to measure the mobile radio system, the costs can be significantly reduced.

Although the base stations can basically be manually switched into the measuring operating state or the measuring operating mode, this switchover is preferably undertaken automatically by the evaluation unit AE.

The base stations switched into the measuring operating mode are in this case preferably in synchronicity with base stations which are in the normal operating mode, in which case, especially where a multicellular mobile radio system in accordance with DECT standard is used, in addition to the field strength values, a synchronicity value or a synchronicity quality can be measured and evaluated. In more precise terms, with DECT for example, what is known as a "multiframe counter" can be used to measure a quality of the synchronicity between overlapping radio cells of adjacent base stations, whereby the quality of the synchronicity in particular represents a measure of interference noise during a handover of a mobile unit not shown in the diagram from one radio cell to another radio cell. Taking into consideration these additional synchronization values or quality the accuracy of an evaluation can thus be further improved for a real radio coverage.

In this way a sufficient overlapping of the radio cells or radio areas within a multicellular mobile radio system can be determined or checked very precisely, in order to initiate suitable countermeasures where necessary.

Since the evaluation unit preferably controls the base stations automatically and the measured field strength data, which can also feature the previously-mentioned synchronicity values, is also automatically evaluated, significant cost savings are produced in the detection of the radio field illumination or radio field coverage of a multicellular mobile radio system.

For further improvement and especially for detecting changes in the radio coverage for example caused by constructional measures within a building or an expansion of the mobile radio system, the detection of the mobile radio system can also be undertaken at predetermined regular or irregular intervals, with a current evaluation result being compared with at least one previous evaluation result. In this way changes in the radio coverage, as produced at regular intervals by constructional measures, can be detected in good time and corresponding countermeasures initiated.

Furthermore the measured field strength data, as is usual with DECT, can also feature a base station identifier. This type of base station identifier is for example the so-called RFPI (Radio Fixed Part Identity) value, which is 40 bits in length according to the DECT standard. In "Private Multiple cells" (AriClass B) the lower 8 bits in this case define the number (maximum 255) of base stations or "Fixed Parts". In DECT mobile radio systems with more than 255 base stations, base stations with the same RFPI value may thus not overlap in radio terms. A mobile unit would in this case be in an undefined area in the overlapping area since unique addressing of the base station is not possible. In accordance with the invention the result is that this type of impermissible state or incorrect planning of the mobile radio system can be detected immediately, since measured field strength data with identical base station identifiers to the base station which is in the measuring operating mode would trigger a warning or an error message in the evaluation unit for example.

FIGS. 3A to 3C show simplified diagrams or a simplified table for this case which occurs especially in DECT mobile radio systems with "Private Multiple cells".

In accordance with FIG. 3A, with incorrect planning or expansion of the multicellular mobile radio system for example, a radio cell FBI with a subscriber line card number SLC-No. 1 can lie for example in the overlapping area of the radio area 2 with subscriber line card number SLC No. 17. Since, as a result of the restricted SLC binary code as shown in FIG. 3C only 4 bits are available for identifying the subscriber line card, the radio areas FB1 and FB2 cannot be uniquely distinguished from each other, in which case a mobile unit located in the overlapping area of these radio areas (or radio cells not shown) receives identical RFPI values from different base stations, which leads to a malfunction.

In accordance with the present invention such a state or such incorrect planning or expansion of the mobile radio system can be detected immediately, since at least one of the base stations switched into the measuring operating mode would measure field strength data with a base station identifier which has the same RFPI identifier as it has itself.

Such misplanning can as a result be detected immediately by the evaluation unit and for example corrected as shown in FIG. 3B, in which case for example the radio cell 2 is now assigned an SLC No. 2. Preferably this type of modification or reconfiguration of the mobile radio system or of the radio coverage is undertaken immediately by the evaluation unit AE, depending on the evaluation result. As a result the evaluation unit AE, on detection of misplanning as shown in FIG. 3A, can reprogram the subscriber line card of the radio area FB2 for example such that it now has the RFPI identifier or SLC No. 2.

In addition to this type of correction or reconfiguration of the RFPI values of overlapping radio areas or associated subscriber line cards SLC, the radio coverage can basically also be modified in respect of its field strength values depending on the evaluation result. For example base stations with variable transmit power could be operated in an area with reduced radio field illumination in an operating mode with increased transmit power in order to compensate for, or at least partly compensate for, constructional changes.

Although the base stations can preferably be switched back and forth between a normal operating mode and a measuring operating mode, a base station also serving as a measuring point can optionally be switched into a measuring mode in addition to its normal operating mode, in which case it executes both modes simultaneously. As a result of the simultaneous operating modes however, restrictions usually emerge in this case for this operating mode, because not all time slots are available for measuring mode and for normal operating mode.

As well as detecting a radio coverage or a sufficient radio field illumination in a multicellular mobile radio system the evaluation unit can create on the basis of the transferred radio field strength data, further so-called field strength maps for determining the position of mobile units located in the mobile radio system. To put it more precisely, by overlaying the installation plans with the evaluated measured field strength data, very accurate, e.g. geographical, field strength maps can be created for a particular mobile radio system, which can be employed using evaluation of the mobile unit field strength data transferred by the mobile units, for determining the positions of the mobile units with high accuracy.

In this way a real radio coverage in a multicellular mobile radio system can be detected or identified quickly and at low cost with the aid of the base stations already installed. Furthermore a radio coverage in mobile radio systems can be checked and optimized at predetermined intervals in this way. In particular an RFPI collision can be reliably detected in DECT mobile radio systems and the mobile radio system adapted automatically.

The invention has been described above with reference to a multicellular mobile radio system in accordance with the DECT standard. However it is not restricted to this and also includes alternative multicellular mobile radio systems in a similar manner.

The invention claimed is:
1. A method for detecting a radio coverage in a multicellular mobile radio system with a plurality of base stations connected to an evaluation unit, comprising:
    providing a plurality of base stations in a normal operating mode, the base stations communicatively connected to an evaluation unit;
    consecutively switching the plurality of base stations, one at a time, from the normal operating mode to a measuring operating mode;
    measuring, by the one switched base station in the measuring operating mode, a field strength of each of the base stations locally adjacent to the one switched base station, with the locally adjacent base stations in the normal operating mode;

measuring, by the one switched base station in the measuring operating mode, a quality of synchronicity between the one switched base station and each of the locally adjacent base stations, with the locally adjacent base stations in the normal operating mode;

sending each measured field strength and measure of synchronicity quality to the evaluation unit;

switching the one switched base station in the measuring operating mode back to the normal operating mode, and evaluating the field strength and synchronicity quality by the evaluation unit;

wherein the consecutive switching of base stations to the measuring operating mode, the measuring of the field strength, the synchronizing, the measuring of the synchronicity quality, the sending, and the switching of the one switched base station back to the normal operating mode is repeated such that each of the plurality of base stations is switched to the measuring operating mode.

2. A method in accordance with claim 1, wherein the radio coverage is detected is in cycles, and wherein the step of evaluating the field strength and synchronicity quality by the evaluation unit provides a current evaluation result based on measured field strength when one of the base stations is in a measuring operating mode and a comparison of measured field strength with a previous evaluation result.

3. A method in accordance with claim 1, wherein the evaluation unit automatically controls the consecutive switching of the base stations and automatically evaluates the measured field strength data.

4. A method in accordance with claim 1, further comprising modifying the mobile radio system by the evaluation unit based on a result of the evaluation.

5. A method in accordance with claim 1, wherein the evaluation unit creates a field string map for determining the position of a mobile unit.

6. A method in accordance with claim 1, wherein the mobile radio system is designed in accordance with a Digital Enhanced Cordless Telecommunications standard.

7. A method in accordance with claim 2, wherein provision of the measured field strength includes provision of a base station identifier.

8. A method in accordance with claim 1, wherein provision of the measured field strength includes provision of a base station identifier.

9. A method in accordance with claim 8, further comprising modifying the mobile radio system with the evaluation unit based on a result of the evaluation.

10. A method in accordance with claim 9, wherein the evaluation unit creates a field string map for determining the position of a mobile unit.

* * * * *